Aug. 26, 1952 H. N. MURPHY ET AL 2,608,020
RODENT AND ANIMAL TRAP
Filed April 17, 1950 2 SHEETS—SHEET 1

INVENTORS
Harry N. Murphy
Martin Weinhart
BY Harry E. Murphy

Sam J. Slotsky
ATTORNEY

Aug. 26, 1952     H. N. MURPHY ET AL     2,608,020
RODENT AND ANIMAL TRAP

Filed April 17, 1950     2 SHEETS—SHEET 2

INVENTORS
Harry N. Murphy
Martin Weinhart
Harry E. Murphy
BY
Sam J. Slotsky
ATTORNEY Patented Aug. 26, 1952

2,608,020

UNITED STATES PATENT OFFICE 2,608,020

RODENT AND ANIMAL TRAP

Harry N. Murphy, Martin Weinhart, and Harry E. Murphy, Sioux City, Iowa

Application April 17, 1950, Serial No. 156,436

5 Claims. (Cl. 43—76)

Our invention relates to a rodent and animal trap.

An object of our invention is to provide a trap of a box-like form in which several rodents or animals can be trapped, and whereby each trapped rodent leaving the trapping compartment re-sets the same.

A further object of our invention is to provide an arrangement in which the rodents will be entrapped in an end receiver whereby they can then be removed by dumping the end receiver.

A further object of our invention is to provide a simplified construction.

Figure 1:
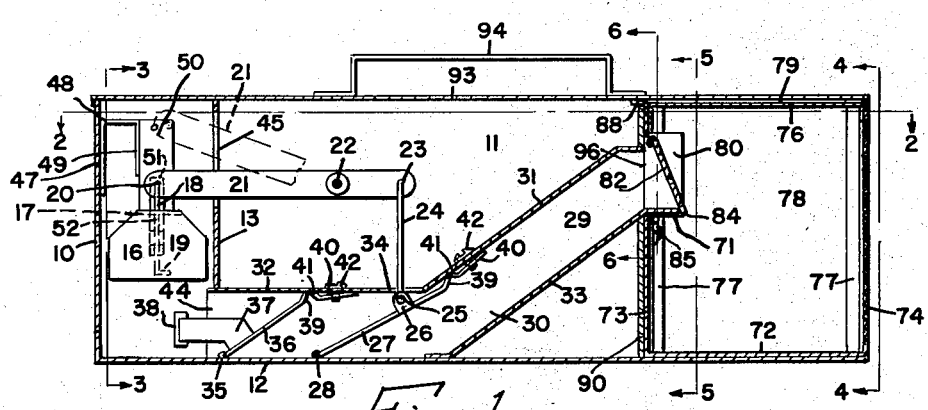
Figure 2:
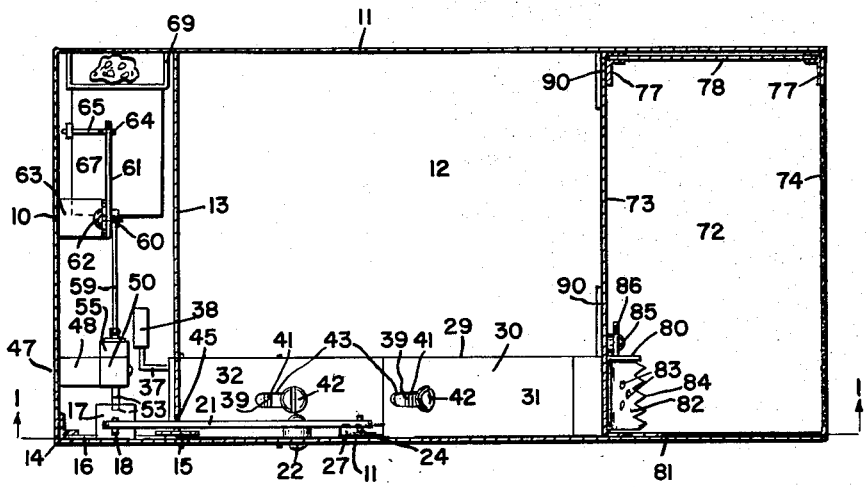
Figure 3:
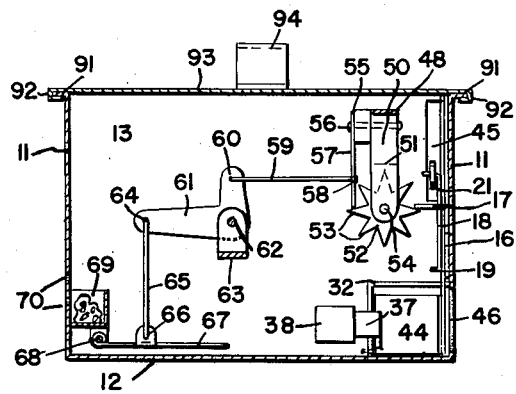
Figure 4:
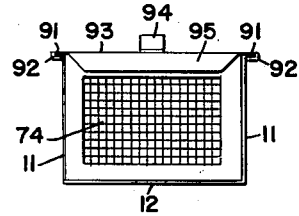
Figure 5:
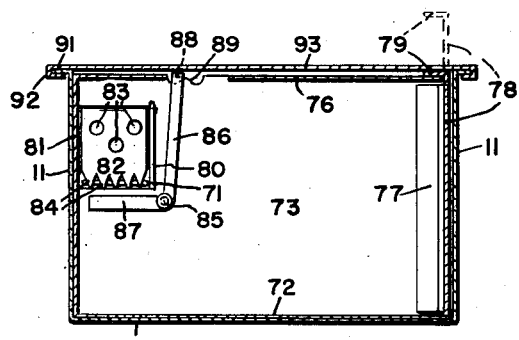
Figure 6:
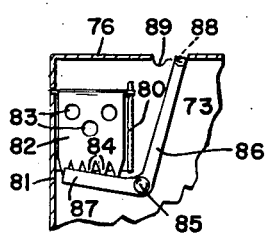
Figure 7:
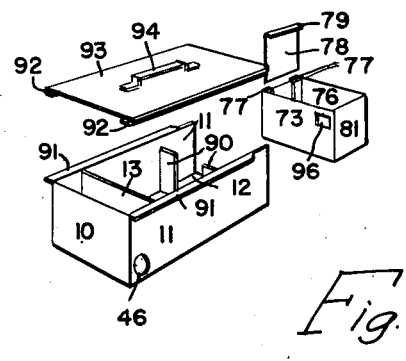

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a sectional elevation taken along the lines 1—1 of Figure 2 of the trap, Figure 2 is a sectional plan view taken along the lines 2—2 of Figure 1, Figure 3 is a sectional view taken along the lines 3—3 of Figure 1, Figure 4 is an end view of the trap viewed along the lines 4—4 of Figure 1, Figure 5 is a sectional view taken along the lines 5—5 of Figure 1, Figure 6 is a sectional detail taken along the lines 6—6 of Figure 1, and Figure 7 is a generally perspective view of the trap portions when the trap is disassembled.

We have used the character 10 to indicate an end wall of a box-like structure forming the outer enclosure of our trap, the character 11 indicating the side walls, and the character 12 the bottom wall.

Positioned transversely of the walls 11 is a partition 13 and secured to the walls 10 and 11 are the guide members 14 and 15 between which guide members passes a door 16 having the flange 17 in which is received a rod 18 terminating in the bent portion 19.

The rod 18 is pivotally secured at 20 to a lever 21 which is pivoted at 22 to one of the side walls 11, the lever 21 being pivoted at 23 to a further rod 24 which is pivoted at 25 to an ear 26 which ear is attached to a treadle 27, the treadle 27 being pivoted at 28 to the side walls 29 and 11 of a passage-way 30, the passageway 30 having the upper walls 31 and 32 and lower walls 33 and 12.

The rod 24 passes through an elongated opening 34 in the top wall 32. Pivoted at 35 to the bottom wall 12 and within the passage-way is a further treadle 36 which is secured to the arm 37 which in turn is attached to a counter-balancing member 38.

The treadles 27 and 36 include the upwardly turned lips 39 which snugly lie adjacently to the strips 40 having the lips 41, the screws 42 passing through elongated openings 43 in the walls 31 and 32, whereby the lips 41 and 39 will be closely adjacent to each other, these lips being provided to prevent the creatures from grasping the treadle and lowering the same so that they could otherwise pass rearwardly back towards the opening.

The passage-way is open at 44 where it communicates to the doorway, and the lever 21 passes through a suitable slot 45.

A circular opening 46 is provided in the wall 11, this opening providing means for allowing entrance of the animals.

Attached at 47 to the end wall 10 is a bracket 48 to which is attached at 49 a member 50, and received within a suitable slot 51 in the member 50 (see Figure 3) is a toothed wheel 52 having teeth 53, the wheel being pivoted at 54 to rotate within the slot 51. Secured to the member 50 is a further bracket 55 to which is attached at 56 the thin leaf spring member 57 which is secured at 58 to a rod 59 which is pivotally secured at 60 to the bell crank member 61 which is pivoted at 62 to a bracket 63, and pivoted at 64 to the member 61 is a further rod 65 which is pivotally secured at 66 (see Figure 3) to a treadle 67 which is pivoted at 68 beneath a bait receiving box 69 having the openings 70 adjacent thereto, such openings allowing the aroma of the bait to pass exteriorly of the box. The passage-way 30 terminates in the platform 71.

Inserted within the end of the box is a further box-like structure having a bottom wall 72, an end wall 73, and a rear wall 74, which rear wall 74 is in the form of a screen, this box-like member also including the top 76 and having the flanges 77 between which flanges is secured a removable door 78 terminating in the grasping flange 79.

Secured to the forward wall 73 is a further flange 80 and pivotally secured to the flange 80 and one of the side walls 81 is a door 82 having the openings 83 therein, and terminating in the toothed lower extremity 84 adapted to rest against the platform portion 71. Pivoted to the wall 73 at 85 is a lever 86 terminating in the portion 87, the lever 86 having an extending portion 88 extending at right angles thereto and engaging against the portion 89 formed in the top of the wall 73, such portion serving to hold the lever 86 in either position whereby the portion 87 will lock the door 82, since the portion 88 can lock in either of the depressions of the member 89, it being noted that the member 89 provides a double cavity for the reception of the member 88 in either position, Figure 5 showing the lever 86 in its up-right position, the operation of this lever being explained later on in the specification.

A pair of partitions 90 are secured to the side walls 11 and are adapted to limit the inward movement of the end box.

Extending from the side walls 11 are the flanges 91 which are snugly received within the channeled sides 92 of the lid 93, the lid 93 having the handle 94, and terminating in the flanged end 95.

The trap operates in the following manner. The mouse or other creature is attracted by the bait in the member 69 and enters through the opening 46. In order to eat the bait, the creature steps on the treadle 67 which forces the rod 65 downwardly and pulls on the rod 59 which releases the left-hand tooth 53 of the wheel 52 as viewed in Figure 3, which will cause the weight of the door 16 due to the engagement of the flange 17 with the right-hand tooth 53, to rotate the wheel 52, and at the same time allowing the door 16 to drop and cover the opening 46. The release of the left-hand tooth 53 is caused by the rod 59 pulling on the leaf spring member 57.

Next, the creature, in seeking an opening in order to escape, will pass through the opening 44 and will step upon the treadle 36, and after passing beyond this treadle, the treadle itself will fall back to normal position due to the counter-balance 38, preventing the escape of the creature.

The creature then steps upon the treadle 27 which pivots the link 21 due to the attachment of the rod 24 thereto, which causes the portion 19 of the rod 18 to raise the door 16 again, where it will be retained by a tooth 53, and after the creature passes over the treadle 27 the link 21 will occupy the position shown in Figure 1 due to the over-balancing weight thereof. The creature then passes upwardly along the passage-way 30 through the openings 96, which openings are provided at the end of the passage-way 30 and also in the end receiving box.

The creature will then push the door 82 outwardly and will fall or jump into the end box having the screened end, the toothed ends 84 preventing return of the creature. The creatures can be released from the end box by slidably moving the lid 93 to the right as viewed in Figure 1, the flange 95 thereby allowing release of the end box, since the entire lid will then be removed, the door 78 can then be opened by raising the flange 79 and the creatures can be dumped into water or disposed of in any desired manner.

It will be noted that the end box also is replaced by merely pushing it against the partitions 90, and then slidably engaging the lid 93 through the agency of the channels 92 and flanges 91 whereby the device is ready for use again.

When it is desired to close the door 82 for emptying the contents of the end box, the lever member 86 is swung toward the right as shown in Figure 6, with the portion 87 lying adjacently to the end 84 of the door 82 so that the door 82 can then not open. It will be noted that the treadle 67 will return to the position shown in Figure 3 after the door is re-opened by virtue of the positioning of the left-hand tooth 53 directly opposite to the right-hand tooth, and in this way it will be noted that the device functions in a fully automatic manner without attention, and will entrap a great many creatures.

It will now be seen that we have provided the various advantages set forth in the objects of our invention with various other advantages being readily apparent.

Some changes may be made in the construction and arrangement of the parts of our invention without departing from the real spirit and purpose of our invention, and it is our intention to cover by our claims any modified forms of structure or use of mechanical equivalents which may be reasonably included within their scope.

We claim as our invention:

1. An animal trap comprising a box-like structure, a passageway in said box-like structure, treadles pivoted within said passageway, said box-like structure having an entrance opening, a door for closing said opening, means for raising said door above said opening including a lever, a rod attached to said lever and to said door, said lever being attached to one of said treadles whereby the weight of an animal upon said treadle will raise said door, means for retaining said door in open position including a rotatable toothed wheel, said door having a flange engaging one of the teeth of said wheel, a bait receiving member secured within said box-like structure, a further treadle pivoted to said bait receiving member, a retaining member engaged with one of the teeth of said toothed wheel, means for releasing said retaining member including a bell crank, a rod attached between said bell crank and said retaining member, and a further rod attached between said bell crank and said further treadle.

2. An animal trap comprising a box-like structure, a passageway in said box-like structure, treadles pivoted within said passageway, said box-like structure having an entrance opening, a door for closing said opening, means for raising said door above said opening including a lever, a rod attached to said lever and to said door, said lever being attached to one of said treadles whereby the weight of an animal upon said treadle will raise said door, means for retaining said door in open position including a rotatable toothed wheel, said door having a flange engaging one of the teeth of said wheel, a bait receiving member secured within said box-like structure, a further treadle pivoted to said bait receiving member, a retaining member engaged with one of the teeth of said toothed wheel, means for releasing said retaining member including a bell crank, a rod attached between said bell crank and said retaining member, a further rod attached between said bell crank and said further treadle, and means for preventing return of animals rearwardly through said passageway including strips secured to said passageway, said strips having up-turned portions, said treadles having further up-turned portions snugly engaging said up-turned portions to prevent manipulation thereof by said animals, said passageway having lengthened slots for providing adjustment of said up-turned portions.

3. An animal trap comprising a box-like structure, a passageway in said box-like structure, treadles pivoted within said passageway, said box-like structure having an entrance opening, a door for closing said opening, means for raising said door above said opening including a lever, a rod attached to said lever and to said door, said lever being attached to one of said treadles whereby the weight of an animal upon said treadle will raise said door, means for retaining said door in open position including a rotatable toothed wheel, said door having a flange engaging one of the teeth of said wheel, a bait receiving member secured within said box-like structure, a further treadle pivoted to said bait receiving member, a retaining member engaged with one of the teeth of said toothed wheel, means for releasing said retaining member including a bell crank, a rod attached between said bell crank and said retaining member, a further rod attached between said bell crank and said further treadle, means for preventing return of animals rearwardly through said passageway including strips secured to said passageway, said strips having up-turned portions, said treadles having further up-turned portions snugly engaging said up-turned portions to prevent manipulation thereof by said animals, said passageway having lengthened slots for providing adjustment of said up-turned portions, an end box for receiving animals therein having an opening communicating with said passageway, a pivoted door normally covering said opening, said opening being positioned at a higher elevation than said end box whereby animals will drop into said end box, partitions against which said end box is placed, and a lid member slidably engaged with said box-like structure including a downwardly bent flange for retaining said end box.

4. An animal trap comprising a box-like structure, a passageway in said box-like structure, treadles pivoted within said passageway, said box-like structure having an entrance opening, a door for closing said opening, means for raising said door above said opening including a lever, a rod attached to said lever and to said door, said lever being attached to one of said treadles whereby the weight of an animal upon said treadle will raise said door, means for retaining said door in open position including a rotatable toothed wheel, said door having a flange engaging one of the teeth of said wheel, a bait receiving member secured within said box-like structure, a further treadle pivoted to said bait receiving member, a retaining member engaged with one of the teeth of said toothed wheel, means for releasing said retaining member including a bell crank, a rod attached between said bell crank and said retaining member, a further rod attached between said bell crank and said further treadle, means for preventing return of animals rearwardly through said passageway including strips secured to said passageway, said strips having up-turned portions, said treadles having further up-turned portions snugly engaging said up-turned portions to prevent manipulation thereof by said animals, said passageway having lengthened slots for providing adjustment of said up-turned portions, an end box for receiving animals therein having an opening communicating with said passageway, a pivoted door normally covering said opening, said opening being positioned at a higher elevation than said end box whereby animals will drop into said end box, partitions against which said end box is placed, a lid member slidably engaged with said box-like structure including a downwardly bent flange for retaining said end box, said end box having a slidably engaged door whereby removal thereof will allow dumping of said animals, and means for retaining said pivoted door comprising a lever member secured within said end box member, said lever member having an extending portion adapted to bear against said door to retain the same.

5. An animal trap comprising a box-like structure, a passageway in said box-like structure, treadles pivoted within said passageway, said box-like structure having an entrance opening, a door for closing said opening, means for raising said door above said opening including a lever, a rod attached to said lever and to said door, said lever being attached to one of said treadles whereby the weight of an animal upon said treadle will raise said door, and means for retaining said door in open position including a rotatable toothed wheel, said door having a flange engaging one of the teeth of said wheel, rotation of said toothed wheel causing release of said flange to cause said door to drop by gravity, a retaining member engaged with one of the teeth of said toothed wheel, release of said retaining member causing said rotation of said toothed wheel.

HARRY N. MURPHY.
MARTIN WEINHART.
HARRY E. MURPHY.

No references cited.